United States Patent [19]
Morgan

[11] 3,944,352
[45] Mar. 16, 1976

[54] HEAT ABSORBING GLASSES

[75] Inventor: David W. Morgan, Corning, N.Y.

[73] Assignee: Corning Glass Works, Corning, N.Y.

[22] Filed: June 17, 1974

[21] Appl. No.: 480,108

[52] U.S. Cl. ............... 353/55; 106/47 Q; 106/52; 106/54

[51] Int. Cl.² ............... G03B 21/18; C03C 3/00

[58] Field of Search ........... 106/47 R, 47 Q, 52, 54; 353/55

[56] References Cited
UNITED STATES PATENTS

| | | | |
|---|---|---|---|
| 1,961,603 | 6/1934 | Berger | 106/54 |
| 2,194,784 | 3/1940 | Berger | 106/53 |
| 2,269,494 | 1/1942 | Tillyer | 106/65 |
| 2,294,844 | 9/1942 | Gelstharp | 106/47 R |
| 2,359,789 | 10/1944 | Pincus | 106/47 R |
| 3,220,861 | 11/1965 | Parry et al. | 106/54 X |
| 3,326,703 | 6/1967 | Harrington | 106/54 |
| 3,711,264 | 1/1973 | Robinson et al. | 106/52 X |

Primary Examiner—Patrick P. Garvin
Assistant Examiner—John F. Niebling
Attorney, Agent, or Firm—Clinton S. Janes, Jr.; Clarence R. Patty, Jr.

[57] ABSTRACT

This invention relates to heat absorbing glass compositions exhibiting strain points in excess of 560°C. and transmissions to visible radiations suitable for optical applications. Such glasses consist essentially of $Fe_2O_3$, $Na_2O$, $Al_2O_3$, $SiO_2$, and $P_2O_5$, wherein $NH_4H_2PO_4$ constitutes an essential ingredient of the batch.

5 Claims, 1 Drawing Figure

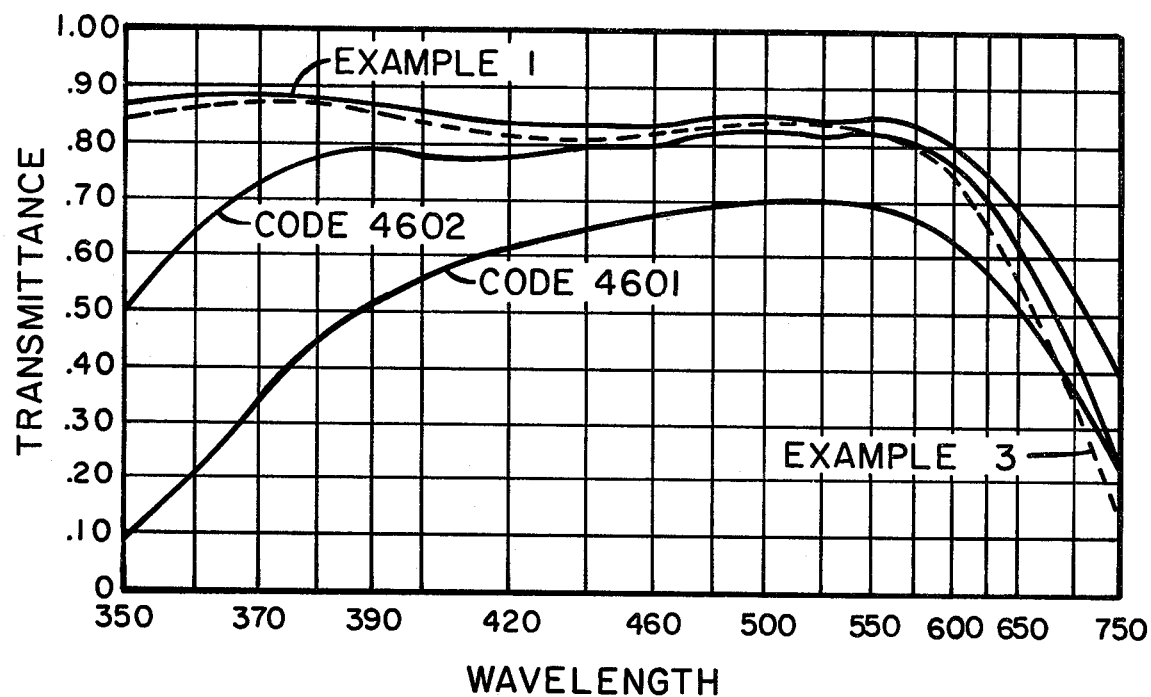

HEAT ABSORBING GLASSES

The heat screen in a slide projector, or other type of light image projection apparatus, is a glass element or lens designed to transmit light to the film and to protect the film from the intense heat generated by the projection lamp or other light source. Indeed, these lenses can reach temperatures of 430°C. and higher during operation of the projection unit. Such elements have commonly been made from thermally tempered, heat absorbing glasses which demonstrate relatively good transmission to radiation having wave lengths within the visible portion of the spectrum.

Corning Code 4602, manufactured by Corning Glass Works, which has been used extensively for that service, has a strain point of 519°C. and a composition, in weight percent as calculated from the batch, of approximately 55.8% $P_2O_5$, 15.2% $Al_2O_3$, 17.9% $SiO_2$, 0.2% $Li_2O$, 1.2% $Na_2O$, 4.1% ZnO, 1.2% FeO, and 4.4% $SnCl_2$. Unfortunately, the high operating temperature of the projection unit gradually changes the stress profile within the glass such that, at localized central areas of the lens, the high internal tensile stress resulting from the tempering treatment moves near the surface. Thereafter, a slight surface defect in close vicinity to the area of internal tension or a slight abrasive action on the lens, e.g., resulting from cleaning it, can lead to fragmentation or explosion of the lens. To counter this breakage problem, it was determined that a glass demonstrating the heat absorbing efficiency and the light transmitting character of the Code 4602 glass, but having a strain point at least about 50°C. higher, would be required. Such a glass could operate at temperatures at least about 50°C. higher that Code 4602 without danger of thermal tempering stresses being relieved.

Therefore, the principal objective of the instant invention is to provide heat absorbing glass compositions exhibiting good transmittance of visible radiations and a strain point in excess of about 560°C.

Heat absorbing glasses in the $Al_2O_3$-$SiO_2$-$P_2O_5$ ternary system containing a small amount of ferrous iron (FeO) are known to the art as is evidenced by U.S. Pat. Nos. 1,961,603 and 2,194,784. The former patent observes that carbonaceous materials may be unsatisfactory as reducing agents for iron since yellow-to-dark brown colorations can result. Therefore, the patent suggests utilizing low oxidation state phosphorous compounds for that purpose, such as calcium hypophosphite and iron phosphide. The latter patent discloses melting such glasses under oxidizing conditions with either antimony oxide or lead oxide present to maintain the iron in the ferrous state.

U.S. Pat. No. 2,269,494 describes the use of silica-free, aluminophosphate glasses containing iron in the ferrous condition as heat screens in film projection systems. There is no discussion as to means for maintaining the iron in the ferrous state.

U.S. Pat. No. 2,294,844 discloses the use of aluminum phosphate as the primary batch ingredient for aluminophosphate glasses instead of providing the phosphate in the form of $P_2O_5$ or phosphoric acid as the glassmaker was accustomed to do. Other metals could also be added as a phosphate, e.g., sodium phosphate.

U.S. Pat. No. 2,359,789 discloses heat absorbing glasses having high strain and softening points making them suitable for heat screens. Such glasses lie in the $Al_2O_3$—$SiO_2$—$P_2O_5$ field and contain iron in the ferrous state. Although the oxidation state of iron is acknowledged to be critical, no specific teaching for securing it is described. Aluminum metaphosphate is declared to be the optimum batch source of $P_2O_5$. The problems of fuming and frothing of the melt when phosphoric acid or ammonium phosphates are utilized as batch materials are discussed. In addition, ammonium phosphates are to be eschewed since they produce an excessive reducing condition in the melt.

U.S. Pat. No. 3,746,556 discloses alkali metal aluminophosphate glasses which are resistant to chemical attack, particularly attack by fluorides. The presence of $SiO_2$ and $B_2O_3$ is to be avoided. The use of various phosphate compounds, including ammonium acid phosphate, as batch materials is discussed. However, no mention is made regarding heat absorbing glasses or any special or unusual function which the ammonium acid phosphate provides when compared with the other conventional raw material recited therein, including aluminum metaphosphate, phosphoric acid, and divalent metal phosphates.

Heat absorbing glasses having strain points in excess of 600°C. are reported in U.S. Pat. No. 3,326,703. These glasses have an aluminoborosilicate base and contain iron oxide to provide the desired heat absorbing capability. Carbon is utilized as the reducing agent. Corning Code 4601 is a commercially marketed glass coming within the purview of that patent. However, whereas those glasses can be suitable for heat shielding windows, their transmittance in the visible portion of the spectrum is inadequate for optical applications such as a lens to act as a slide projector heat screen.

I have found that certain glass compositions consisting essentially, in weight percent on the oxide basis, of about 0.5–3% FeO, 0.5–3% $R_2O$, wherein $R_2O$ consists of $Li_2O$, $Na_2O$, and/or $K_2O$, 12–16% $Al_2O_3$, 10–30% $SiO_2$, and 50–65% $P_2O_5$ will illustrate exceptional efficiency in heat absorbing character, while exhibiting very good transmittance in the visible portion of the radiation spectrum, and will possess strain points greater than 560°C. Since the iron content must be in the reduced state to act effectively as a heat absorbing agent, the presence of a reducing agent in the batch is demanded. Of the myriad reducing agents studied, monobasic ammonium phosphate ($NH_4H_2PO_4$) proved greatly superior. In general, adding about one to three weight percent of the required $P_2O_5$ content as the ammonium phosphate will maintain the iron in the reduced state without lowering the strain point of the glass. Up to about 9% of the $P_2O_5$ content can be added as $NH_4H_2PO_4$ without adversely affecting the glass properties. However, the use of such large amounts does not appear to impart any improved properties to the glass. Therefore, since the presence of that material can hazard attack of platinum metal which is conventionally employed in melting units for optical and ophthalmic glasses, additions thereof will normally be confined to those amounts necessary to keep the iron in the reduced state.

The addition of up to 10% $B_2O_3$ can be useful in improving the melting and forming behavior of the glass. Also, the inclusion of up to 5% ZnO appears, in certain compositions, to improve the melting and forming character of the glass while still maintaining the strain point at the desired high level. In view of these factors, the preferred glasses of the invention will contain small amounts of these two ingredients, normally in substitution for part of the $SiO_2$ content. $Sb_2O_3$ may be included in its conventional application as a fining agent.

Table I records a group of glass compositions operable in the instant invention expressed in terms of weight percent on the oxide basis. The batch materials, other than the required presence of monobasic ammonium phosphate (an amount equivalent to yield about 3% $P_2O_5$ in the cited examples), may comprise any materials, either the oxide or other compound, which, upon being melted together, will be converted into the desired oxide in the proper proportion. In the following examples, the batch ingredients were compounded, blended together in a ball mill to assist in obtaining a homogeneous melt, and placed into silica crucibles. The crucibles were set in an electrically-fired furnace and the batches melted for four hours at 1550°C. The melts were poured into steel molds to produce squares about 6 in. × 6 in. × ½ in. and these squares transferred to annealers operating at 600°–700°C.

Since the batches contained ammonium phosphate, a relatively strong reducing agent, contact with platinum should be avoided. However, after the batch reactions are completed, and assuming no large excess of $NH_4H_2PO_4$ has been included, the melts can be brought into contact with platinum. This feature permits the use of platinum refiner and delivery systems in commercial melting units such that glass of good optical quality can be achieved.

The physical properties recited were determined in accordance with conventional measuring techniques. The appended drawing reports a spectrophotometric comparison of the transmittance demonstrated by the glasses of the present invention with Corning Code 4601 and Code 4602 described above in the visible portion of the radiation spectrum. A polished section of 5 mm. thickness was employed for each sample. The softening point (Soft.), annealing point (Ann.), and strain point (Str.) are reported in °C. The coefficient of thermal expansion (Exp.) was measured over the range of 25°–300°C. and is recorded in terms of × $10^{-7}$/°C. The density (Den.) is recorded as g/cm$^3$.

TABLE I

|  | 1 | 2 | 3 | 4 | 5 |
|---|---|---|---|---|---|
| $P_2O_5$ | 57.15 | 56.5 | 58.3 | 57.6 | 56.7 |
| $Al_2O_3$ | 13.68 | 13.6 | 14.0 | 13.8 | 13.6 |
| $SiO_2$ | 25.56 | 23.5 | 15.9 | 26.8 | 26.4 |
| $Na_2O$ | 1.47 | 1.5 | 1.5 | — | — |
| FeO | 1.13 | 1.1 | 1.7 | 1.1 | 1.1 |
| $B_2O_3$ | — | — | 4.5 | — | — |
| ZnO | — | 3.8 | 3.9 | — | — |
| $Li_2O$ | — | — | — | 0.7 | — |
| $K_2O$ | — | — | — | — | 2.2 |
| Soft. | — | 786° | 810° | 818° | 825° |
| Ann. | 645° | 613° | 610° | 639° | 651° |
| Str. | 605° | 580° | 570° | 601° | 614° |
| Exp. | — | 54.9 | 55 | 53.5 | 56.0 |
| Den. | — | 2.521 | 2.5 | 2.482 | 2.506 |

It is apparent from the appended drawing that the transmittance of Code 4601 glass in the visible portion of the spectrum is substantially inferior to that of Code 4602 glass and the glasses of the instant invention. As has been explained above, the effectiveness of iron as a heat absorbing agent, while concomitantly assuring good visible transmittance, is dependent upon maintaining it in the reduced state. Hence, Corning Code 4602, supra, contains about 5% $SnCl_2$ as a reducing agent. The spectrophotometric curve in the appended drawing points up the utility of $SnCl_2$ for that purpose. Unfortunately, $SnCl_2$ lowers the strain point of the glass and, therefore, cannot be considered in the present invention. Additions of various forms of carbon, e.g., starch, sugar, etc., resulted in the development of brownish colored areas which rendered the glass unsuitable for optical applications. $Sb_2O_3$, which can act as a reducing agent in certain glasses, was found to be essentially ineffective in the composition system of the present invention. $NH_4H_2PO_4$ appeared to be unique in securing complete reduction of the iron while having a minimal effect upon the strain point of the glass. The preferred addition thereof is an amount required to provide about 3% $P_2O_5$. Additions much in excess of that which would provide about 9% $P_2O_5$ ought to be avoided where platinum will come into contact with the melt.

In general, the glass compositions will consist solely of the septenary $FeO$—$R_2O$—$Al_2O_3$—$SiO_2$—$P_2O_5$—$B_2O_3$—$ZnO$ to achieve the most desirable properties. However, it will be appreciated that minor amounts of various compatible metal oxides can be tolerated without seriously degrading the characteristics of the glass. Such oxides can include, for example, the alkaline earth metal oxides, $La_2O_3$, $ZrO_2$, and PbO. Nevertheless, the total of all such additions will preferably not exceed about 5% by weight.

I claim:

1. A batch for a heat absorbing glass exhibiting very good transmittance in the visible portion of the radiation spectrum and having a strain point higher than 560°C. consisting essentially, by weight on the oxide basis, of about 0.5–3% FeO, 0.5–3% $R_2O$, wherein $R_2O$ consists of $Li_2O$, $Na_2O$, and/or $K_2O$, 12–16% $Al_2O_3$, 10–30% $SiO_2$, and 50–65% $P_2O_5$, wherein $NH_4H_2PO_4$ is utilized as a batch ingredient in an amount sufficient to provide about 1–9% $P_2O_5$.

2. A batch according to claim 1 wherein said glass also contains up to 10% $B_2O_3$ and up to 5% ZnO.

3. A batch according to claim 1 wherein said $NH_4H_2PO_4$ is utilized in an amount sufficient to provide about 3% $P_2O_5$.

4. In a light image projection apparatus, wherein said image is produced by passing light through a film, comprising a light source and a glass element designed to transmit light to said film and to protect said film from the heat generated by said light source, the improvement which comprises utilizing as said glass element a heat absorbing glass exhibiting very good transmittance in the visible portion of the spectrum, having a strain point higher than 560°C. and being made from a batch consisting essentially, by weight on the oxide basis, of about 0.5–3% FeO, 0.5–3% $R_2O$, wherein $R_2O$ consists of $Li_2O$, $Na_2O$, and/or $K_2O$, 12–16% $Al_2O_3$, 10–30% $SiO_2$, and 50–65% $P_2O_5$, wherein $NH_4H_2PO_4$ is utilized as a batch ingredient in an amount sufficient to provide about 1–9% $P_2O_5$.

5. An image projection apparatus according to claim 4 wherein said glass also contains up to 10% $B_2O_3$ and up to 5% ZnO.

* * * * *